Dec. 7, 1926.
E. H. SMITH
1,609,891
LIQUID FUEL FEEDING APPARATUS
Filed Dec. 8, 1924
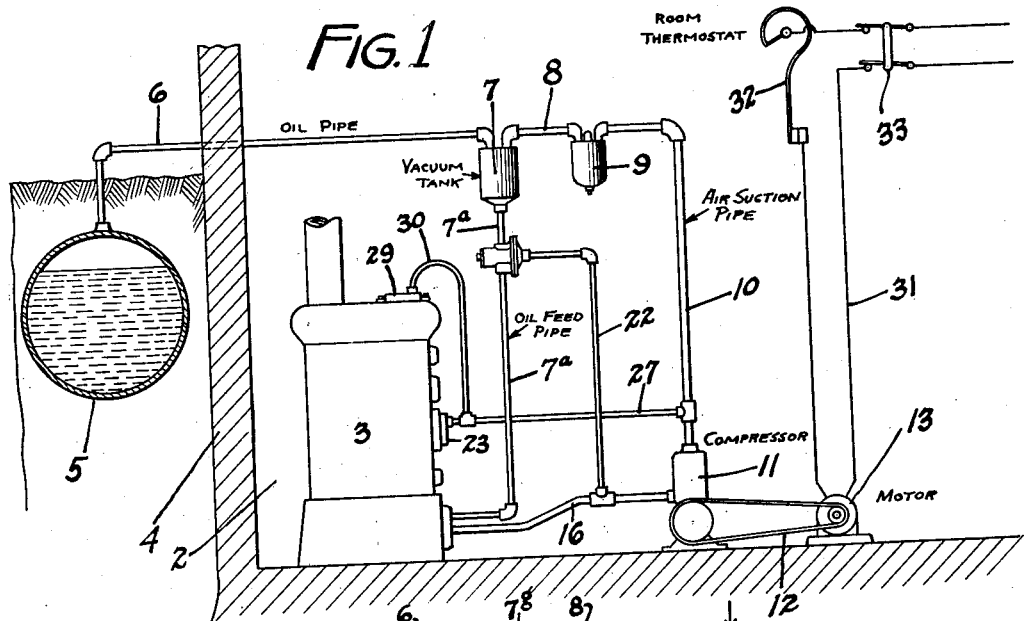
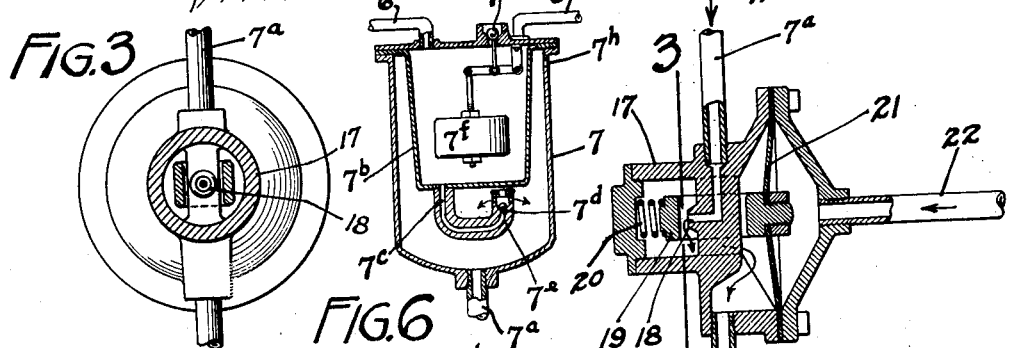
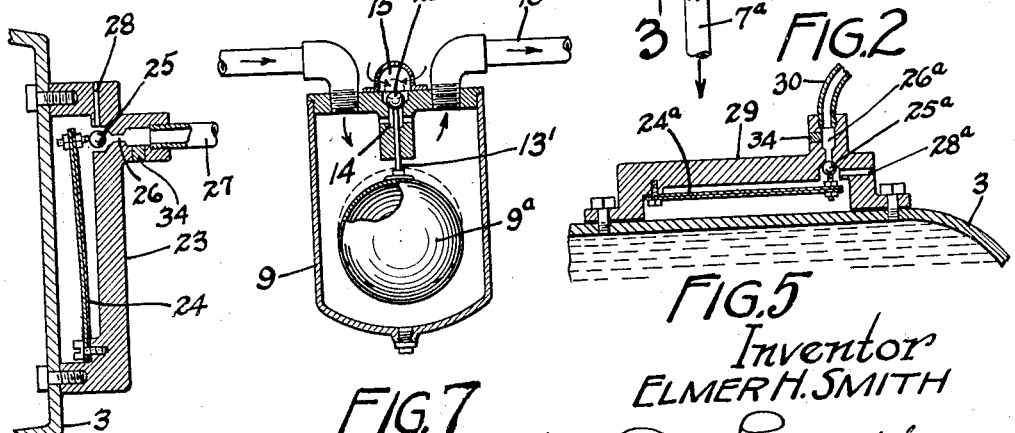
Inventor
ELMER H. SMITH
By Paul, Paul & Moore
ATTORNEYS Patented Dec. 7, 1926.

1,609,891

UNITED STATES PATENT OFFICE.

ELMER H. SMITH, OF MINNEAPOLIS, MINNESOTA, ASSIGNOR, BY MESNE ASSIGNMENTS, TO SENAC AUTOMATIC OIL BURNER CORPORATION, OF DULUTH, MINNESOTA, A CORPORATION OF DELAWARE.

LIQUID-FUEL FEEDING APPARATUS.

Application filed December 8, 1924. Serial No. 754,575.

In the operation of the so-called liquid fuel burners used with heating plants of various types of residences or other heating, difficulty has been experienced in regulating or controlling the feed of the fuel to the burner to insure positive delivery of the fuel at the point of atomization and ignition and the shutting off positively of such feed in case the burner or the vaporizing or atomizing adjunct fail to properly perform and function. Sometimes, the pilot light becomes accidentally extinguished so that no combustion of the fuel takes place but feed or delivery continues with the consequent flooding of the heater and the filling of the house or other building with a damaging smudge or smoke. Sometimes the vacuum tank used in connection with many styles of liquid fuel burners fails for some reason to perform its function resulting in the flooding of the suction line and the rendering of the compressor inoperative to perform its usual functions.

The object, therefore, of my present invention is to provide means in connection with the compressor, suction and compression lines, whereby the flow of liquid fuel to the heater is positively and automatically controlled, such means in this present application specifically including a thermostatically controlled air valve by means of which the vacuum or compression lines of a pneumatic feeding apparatus may be opened or closed to the atmosphere.

Other objects of the invention will appear from the following detailed description.

In the accompanying drawings forming part of this specification,

Figure 1 is a view illustrating the manner of applying my improvement to a heater for controlling the delivery of liquid fuel thereto;

Figure 2 is a sectional view of a valve for regulating the flow of fuel to the heater burner;

Figure 3 is a sectional view on the line 3—3 of Figure 2;

Figure 4 is a detail sectional view of a thermostatic bar device connected with the wall of the heater for rendering the suction line operative when the temperature of the heater wall has been raised to a certain predetermined point;

Figure 5 is a detail sectional view through the top of the heater showing a thermostatic bar device for controlling the vacuum line of the apparatus;

Figure 6 is a detail sectional view of the preferred form of vacuum tank employed in connection with this apparatus;

Figure 7 is a detail sectional view showing the device for destroying the vacuum in the suction pipe in case the vacuum tank mechanism should fail to operate properly.

In the drawing, 2 represents a suitable basement wherein the heater 3 is arranged within a suitable enclosing wall 4. A liquid fuel supply tank 5 is provided outside the wall of the basement, placed a suitable distance under ground as required by the ordinance and having a liquid feed pipe 6 leading therefrom and extending to a vacuum tank 7 that is arranged in the basement adjacent the heater 3. Within the tank 7, I provide a cup $7^b$ having a discharge duct $7^c$ leading to an outlet port $7^d$ that is normally closed by a gravity valve $7^e$. This valve will open under the pressure of the liquid fuel in the cup $7^b$ and allow the fuel to flow into the bottom of the tank 7 from which it is discharged by gravity through the pipe $7^a$ to the burner. A float $7^f$ is provided within the cup $7^b$ and controls a valve $7^g$ which is adapted to open when the float is raised and admit air to the cup $7^b$ and destroy the vacuum in the suction pipe. This takes place when a certain predetermined volume of fuel has entered the cup. At such time, the suction of the compressor will be checked and feed of fuel from the tank 5 to the vacuum tank will cease. An air intake port $7^h$ is provided in the wall of the tank 7 leading to the chamber in the bottom of the tank 7, and in practice there will be a supply of liquid fuel in this chamber. A suction pipe 8 leads from this vacuum tank to a closed tank 9 and a similar pipe 10 leads from the tank 9 to the suction side of a compressor 11 of standard construction and operated through a belt 12 from a suitable motor 13. If, for any reason, the vacuum tank should fail to operate properly and become flooded with a liquid fuel, it will flow through the pipe 8 to the tank 9, and when a certain predetermined quantity of the liquid fuel has accumulated in the tank 9, it will lift the float 9ª therein, raising a ball valve 12' that is mounted on the stem 13' and opening the port 14 leading from the tank 9 to a passage 15 which communicates with the atmosphere. Normally the float will be in the position shown in Figure 7, and the valve will be closed preventing the entrance of air into the tank, but should the float be raised by the accumulation of liquid in the tank, it will raise the valve 12', admit air to the tank and destroy the vacuum. Upon the removal of the liquid fuel in the tank 9, the float will drop to its normal position and close the air intake. Thus, it will happen that should the compressor 11 operating to lift the fuel from the tank 5 cause the filling of the tank 9 through the failure of the vacuum tank to properly operate, then the float 9ª will be lifted, air admitted to the tank 9 and the suction broken or destroyed and the flow of liquid fuel from the tank 5 immediately checked.

A pipe 7ª leads from the vacuum tank 7 to the burner of the heater and through this pipe the liquid fuel is allowed to flow by gravity to the burner. A compression pipe 16 extends from the compressor 11 to the heater and has the function of delivering air to atomize the liquid fuel discharged into the burner through the pipe 7ª. A valve casing 17 is interposed in the pipe 7ª and has a valve seat 18 and a valve 19 that is normally held to its seat by a spring 20. A diaphragm 21 is mounted on the housing 17 and connected with the valve 19 and one side of the diaphragm communicates through a compression pipe 22 with the compression pipe 16 so that when air, under pressure, is admitted to the pipe 16 it will flow through the pipe 22 to a point on one side of the diaphragm 21, and thereupon the valve 19 will be opened against the tension of the spring 20 to allow the flow of liquid fuel by gravity from the tank 7 down through the pipe 7ª to the burner of the heater.

A housing 23 is mounted on the heater wall and supports a thermostatic bar 24 carrying a valve 25 that is adapted to close a port 26 which communicates with the suction pipe 27 which leads to the pipe 10. The thermostatic bar 24 and the valve 25 are normally in their open position, being held by the tension of one element of the thermostatic bar. The housing 23 has an air intake duct 28 and when the thermostatic bar is in its normal position, the entrance of air into the pipe 27 through the duct 28 is permitted for the purpose of destroying the vacuum and preventing feed of the liquid fuel to the vacuum tank. As soon, however, as the wall of the heater becomes sufficiently warm, the thermostatic bar will be distorted or bent and cause the valve 25 to be moved to its closed position, thereby preventing the entrance of air through the duct 28 to the pipe 27 and insuring a sufficient suction in the pipe 10 to raise the liquid fuel from the tank 5 and deliver it to the vacuum tank. This closing of the thermostatic bar and the initial raising of the liquid fuel from the supply tank for discharge to the vacuum tank will take place soon after the burner is ignited following the delivery by gravity of a limited quantity of liquid fuel from the vacuum tank. Initially, the thermostatic bar device will be inoperative and the bar will be sufficiently stiff to hold the valve 25 in its open position in spite of the suction of the compressor, but when the bar becomes flexed through its proximity to the heated wall of the heater, the valve 25 will close and thereupon a suction will be established in the pipe 10 and the raising of the liquid fuel from the supply tank will begin and its delivery and feed to the vacuum tank will commence and continue until the vacuum in the suction pipe is again destroyed. If the vacuum tank should fail to perform its functions properly and the liquid fuel accumulate therein and flow into the tank 9, the vacuum will be destroyed by the raising of the float 9ª as described. If for any reason the compression side of the compressor fails to properly function the spring 20 will return the valve 19 to its closed position and positively shut off the flow of liquid fuel through the feed pipe to the heater. If for any reason the burner flame should become extinguished, the thermostatic bar will operate the air valve and admit air to the system to destroy the vacuum and check the feed of fuel to the burner as soon as the walls of the heater become sufficiently cool to allow the bar to operate. In this way, flooding of the heater with liquid fuel, when the burner is extinguished and all the attendant evils resulting therefrom, will be positively prevented.

I prefer to provide an additional adjunct to this device consisting of a housing 29, preferably mounted on the upper wall of the heater in proximity to the circulating fluid therein, and having a thermostatic bar 24ª and a valve 25ª normally closing the passage 26ª to the suction pipe 30. The thermostatic bar, when the temperature of the circulating fluid exceeds a predetermined point, opens the valve 25ª, admitting air to the pipe 30 through the duct 28ª and destroying the vacuum and checking the feed. This controlling device instead of being placed in the suction line may be introduced into the compression line of the apparatus in which case the movement of the thermostatic bar would be reversed but its operation would be identical with that described and hence the application of this thermostatic control to the compression line is not thought to be necessary for a clear understanding of the invention.

The motor located in a suitable place in the basement for operating the compressor has preferably a control circuit 31 leading to a thermostat 32 located in the room, the temperature of which is to regulate the feed of fuel to the heater, a suitable switch 33 being introduced in the circuit between the thermostat and motor conductors and those leading to the service line. The thermostat will control the operation of the motor and through the motor the compressor will be regulated and the delivery of liquid fuel to the burner of the heater positively and accurately controlled.

In Figure 4, I have shown a fusible plug 34 which, should the heater reach a very high or undesirable temperature for any reason, will fuse and admit air to the suction pipe 27, destroy the vacuum and check the feed of liquid fuel to the vacuum tank.

In the operation of the device, the compressor being started, the valve in the gravity pipe will open, allowing a supply of fuel to flow to the heater from the vacuum tank. This fuel becoming ignited by a suitable means, not shown, the walls of the heater will gradually become hot and the thermostatic bar 24 will be actuated to close the valve 25, shut off the entrance of air through the duct 28 and allow the suction side of the apparatus to begin to function to draw liquid fuel from the tank 5 to the vacuum tank. The feed of the fuel will thereupon continue until such time as the hermostatically controlled compressor is stopped or the second thermostatic device becomes influenced by the heat of the circulating medium to open the valve 25ª and the vacuum line to the atmosphere. Thereupon, suction in the line will cease and feed of fuel from the tank be discontinued. It will be understood that a similar means may be employed to prevent compression in the compression line of the motor and thereby interrupt the feed of the fuel. In this way, I am able to positively control the delivery of liquid fuel to the heater and by the provision of the air valve, I can make or destroy the vacuum and compression in the respective lines to render the feed operative or inoperative as desired. The air valve and its thermostatic connection thus forms an automatic means for controlling the feed of the liquid fuel to the heater. It will be understood that the delivery of the fuel to the heater may be affected through the compression line instead of the vacuum line of the apparatus, the control of this compression line being accomplished by means of the air valve substantially as shown and described herein.

I claim as my invention:

1. A liquid fuel feed apparatus comprising a fuel supply tank, a vacuum tank normally containing a supply of fuel and having a suction pipe connection with said supply tank and a gravity pipe connection with the heater, an air compressor having a suction pipe connection with said vacuum tank and a compression pipe connection with the heater, an air compressor having a suction pipe connection with said vacuum tank and a compression pipe connection with the heater, a valve in said gravity pipe connection normally closing the passage therethrough and having a pipe connection with said compressor and adapted to be opened by said compressor to deliver fuel by gravity to the heater upon the initial operation of said compressor, means preventing the formation of a vacuum in said suction pipe when the heater is cold and controlled by the rise in temperature of the heater to permit a vacuum in said suction pipe and the feed of fuel from said tank, and means controlled by the temperature of the heater circulating medium for checking the feed of liquid fuel.

2. A liquid fuel feed apparatus comprising a fuel supply tank, a vacuum tank normally containing a supply of fuel and having a suction pipe connection with said supply tank and a gravity pipe connection with the heater, an air compressor having a suction pipe connection with said vacuum tank and a compression pipe connection with the heater, a valve in said gravity pipe connection normally closing the passage therethrough and having a pipe connection with said compressor and adapted to be opened by said compressor to deliver fuel by gravity to the heater upon the initial operation of said compressor, means preventing the formation of a vacuum in said suction pipe when the heater is cold and controlled by the rise in temperature of the heater to permit a vacuum in said suction pipe and the feed of fuel from said tank, said means comprising a thermostatic bar and valve adapted to close the air intake of said suction pipe when said bar is heated to a predetermined degree.

3. A liquid fuel feed apparatus comprising a fuel supply tank, a vacuum tank normally containing a supply of fuel and having a suction pipe connection with said supply tank and a gravity pipe connection with the heater, an air compressor having a suction pipe connection with said vacuum tank and a compression pipe connection with the heater, a valve in said gravity pipe connection normally closing the passage therethrough and having a pipe connection with said compressor and adapted to be opened by said compressor to deliver fuel by gravity to the heater upon the initial operation of said compressor, means preventing the formation of a vacuum in said suction pipe when the heater is not in operation and controlled by the rise in temperature of the heater to permit a vacuum in said suction pipe and the feed of fuel from said tank, and means for destroying the vacuum in said suction pipe should said vacuum tank fail to operate.

4. A liquid fuel feed apparatus comprising a fuel supply tank, a vacuum tank normally containing a supply of fuel and having a suction pipe connection with said supply tank, and a gravity pipe connection with the heater, an air compressor having a suction pipe connection with said vacuum tank and a compression pipe connection with the heater, a thermostatically controlled motor for operating said air compressor, means normally closing said gravity pipe and adapted to be opened by said compressor upon its initial operation to deliver fuel by gravity to the heater, said suction pipe being normally open to the air to prevent the formation of a vacuum upon the initial operation of said compressor, and means governed by the heat of the burning fuel for closing the air intake to said suction pipe and delivering the liquid fuel from said supply tank to said vacuum tank, when the temperature of the heater reaches a predetermined degree and open said air intake and check the feed of fuel when the temperature of the heater falls below a predetermined degree.

5. In combination, with a heater, a vacuum system including a vacuum tank, a pump having one side connected with the vacuum tank and the other side connected with the heater, an oil delivery line from the vacuum tank to the heater, a pneumatic and spring operable valve in said delivery line, and connections from the pump line for operating the valve pneumatically, and thermostatic control connections between the heater and pump line, for rendering oil delivery by the pump alternately effective and ineffective.

6. In combination with a heater, an oil supply tank, a vacuum tank, an air pump, and a thermostatic device on the heater, pipe lines respectively connecting the oil supply and vacuum tanks, vacuum tank and pump, pump and heater, and vacuum tank and heater, and a pipe line connecting the thermo device with the suction side of the pump line, and a valve in the vacuum tank-heater line, adapted to be opened by pressure and closed automatically, and a pump line connecting the pressure side of the valve with the corresponding side of the pump line.

7. A liquid fuel feed apparatus comprising a fuel supply tank, a heater, a vacuum tank normally containing a supply of liquid fuel and having a suction pipe connection with said supply tank and a gravity pipe connection with the heater, an air compressor having a suction pipe connection with said vacuum tank and a compression pipe connection with the heater, and a pneumatic valve automatically controlled by the heat of the burning fuel to start the feed of fuel when the temperature of the heater reaches a predetermined point and check the feed when the temperature of the heater falls below a certain degree.

8. In combination with a heater, a vacuum fuel supply system, including a vacuum tank, a fuel delivery pipe line leading downwardly from said tank to the heater, an air pump having pipe line connection with said vacuum tank on the suction side and with said heater on the compression side, a valve in the fuel delivery line adapted to be opened pneumatically and closed automatically, and having pneumatic control connection with the pump line on the compression side for opening the valve for a gravity fuel delivery upon initial starting of the pump, a branch pipe connecting with the pump line on the suction side and having an open end thermostatically controllable at the heater, for alternately annulling and restoring pumping effects, respectively to prevent delivery of fuel by the pump while gravity delivery is taking place, and to obtain such delivery and close the valve to gravity delivery, according as the temperature is lowered or raised to a predetermined point.

9. In combination with a heater, a vacuum fuel supply system, including a vacuum tank, a pump and a thermo device on the heater, pipe lines respectively connecting the vacuum tank and pump, the pump and heater, and vacuum tank and heater, a pipe line connecting the thermo device with the compression side of the pipe line, a valve in the vacuum tank-heater line adapted to be opened by pressure and closed automatically, a pipe line connecting the pressure side of the valve with the corresponding side of the pump line, and a tank and automatic valve means therein connected on the suction side of the pump line for annulling suction effects of the pump in case of malfunctioning of the vacuum tank.

10. A liquid fuel apparatus comprising a fuel supply tank, a heater, a vacuum tank normally containing a supply of liquid fuel and having a pipe connection with said supply tank and with the heater, a pump having a pipe connection with said vacuum tank and with the heater, and a pneumatic valve automatically controlled by the heat of the burning fuel to start the feed of fuel when the temperature of the heater reaches a predetermined point and check the feed when the temperature of the heater falls below a certain degree.

11. A liquid fuel feed apparatus comprising a fuel supply tank, a heater, a vacuum tank normally containing a supply of liquid fuel and having a pipe connection with said supply tank and adapted to deliver an initial or priming supply of liquid fuel to the heater, a pump having a pipe connection with said vacuum tank and a fuel supply connection with the heater, and a thermostatically controlled pneumatic valve mounted adjacent the heater and having a passage to the atmosphere and a pipe connection with the pump line to said vacuum tank, said valve normally opening said pipe connection to the atmosphere and adapted to be operated by the heat of the initial fuel delivery to the heater to shut off the passage to the atmosphere when the temperature of the heater reaches a predetermined point.

12. A liquid fuel feed apparatus comprising a fuel supply tank, a vacuum tank normally containing a supply of fuel and having a pipe connection with said supply tank and with a heater, a pump having a pipe connection with said vacuum tank and with the heater, means normally closing the connection of said vacuum tank with the heater, and adapted to be opened by said pump upon its initial operation to deliver fuel to the heater, the pipe connection of said pump with the heater being normally open to the atmosphere to prevent formation of a vacuum upon the initial operation of the pump, and means governed by the heat of the initially burning fuel for closing said pump connection with the heater and delivering the liquid fuel from said supply tank to said vacuum tank when the temperature of the heater reaches a predetermined degree, and open said pipe connection with the heater and check the feed of fuel when the temperature of the heater falls below a predetermined degree.

13. The combination with a heater and a liquid fuel supply tank therefor, of a pump having pipe line connections with said supply tank and heater for delivering liquid fuel to the heater, a thermostatically controlled air valve adjacent the heater to be affected by the temperature thereof and connected with the supply tank pipe line to normally check the feed when the heater is cold, means for delivering an initial supply of fuel to the heater, and said air valve being adapted to be thermostatically actuated by the heat of the initially burning fuel for rendering said pump effective to start the feed of fuel from said supply tank when the temperature of the heater reaches a predetermined point.

In witness whereof, I have hereunto set my hand this 1st day of December, 1924.

ELMER H. SMITH.